United States Patent Office 2,957,557
Patented Oct. 25, 1960

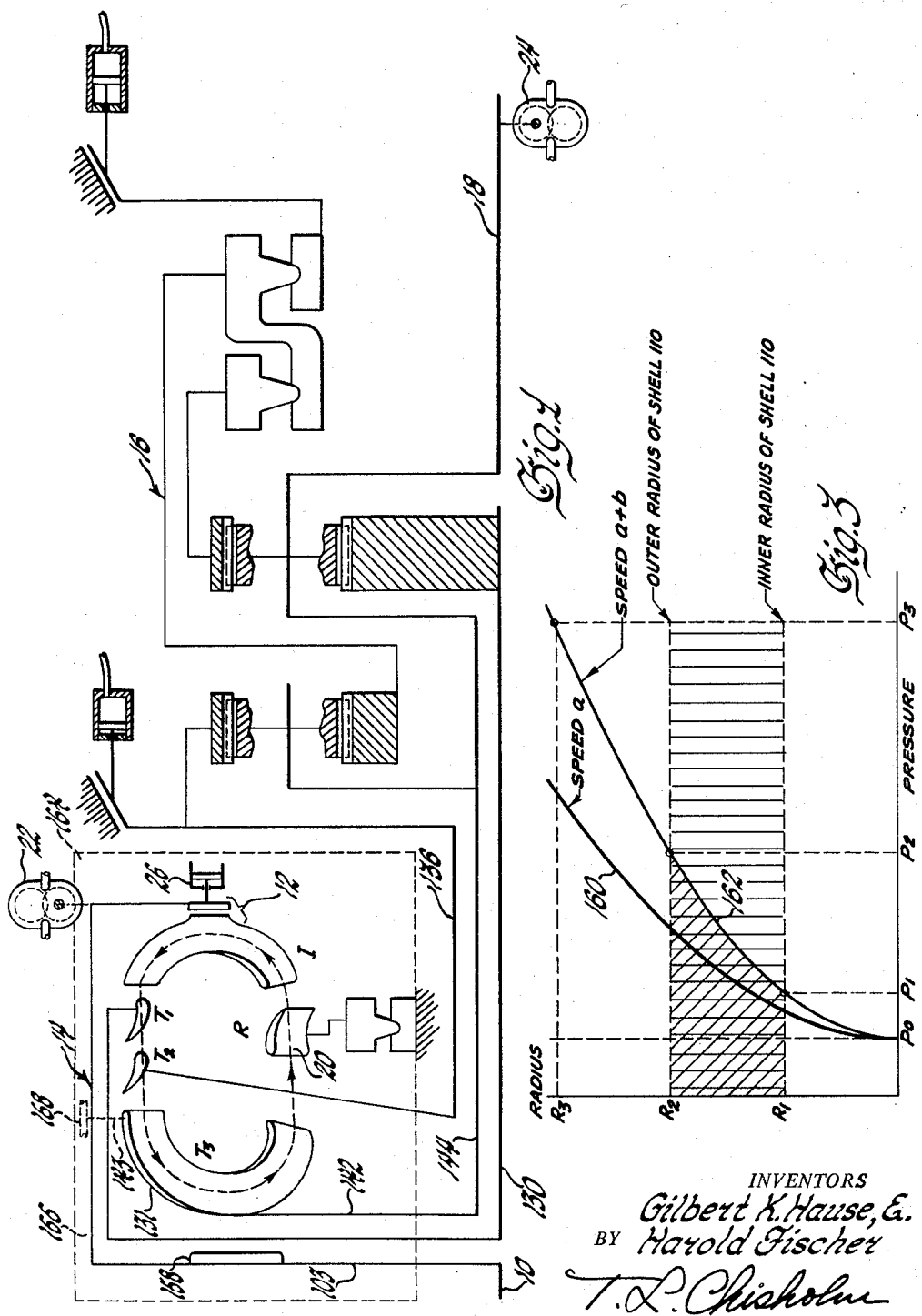

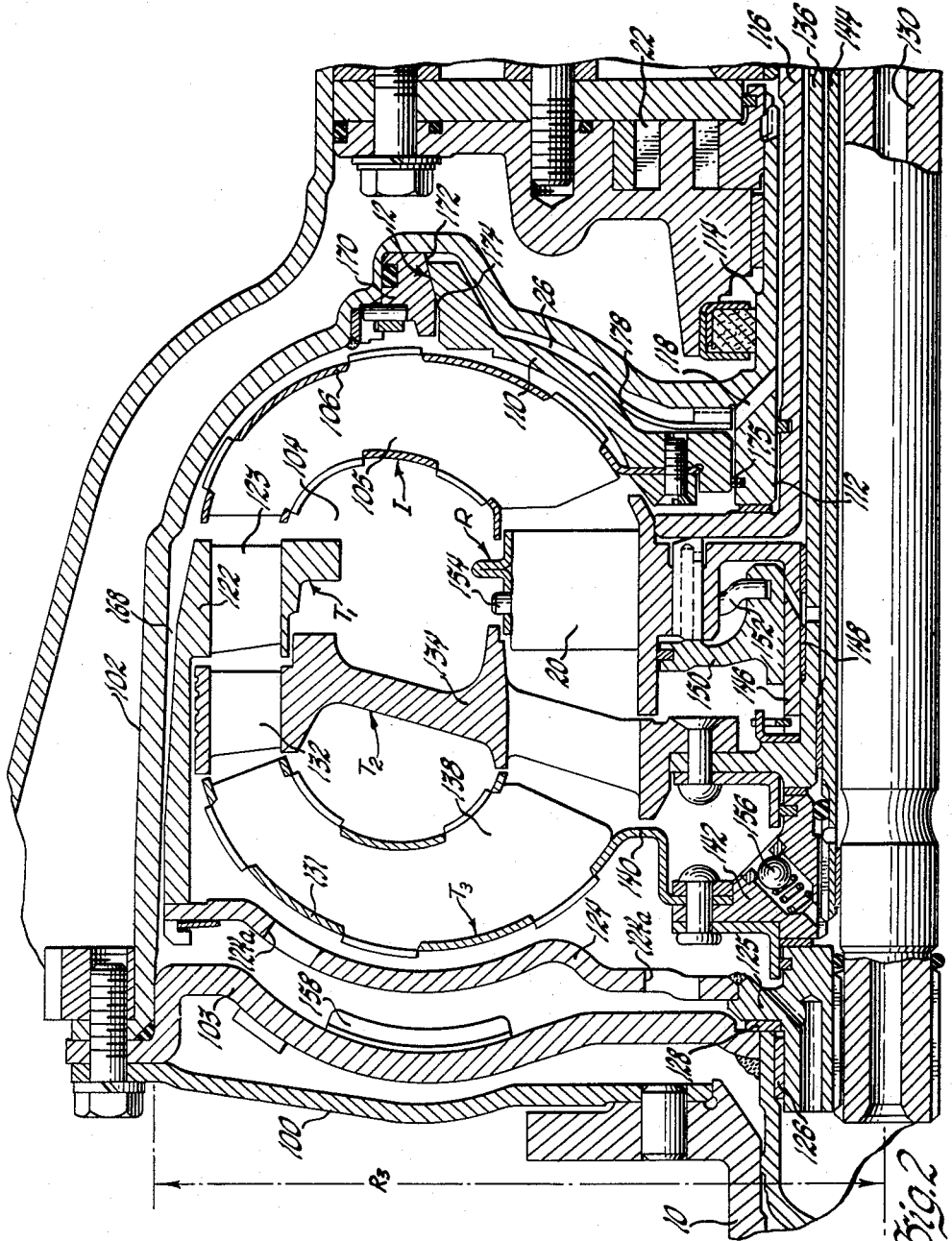

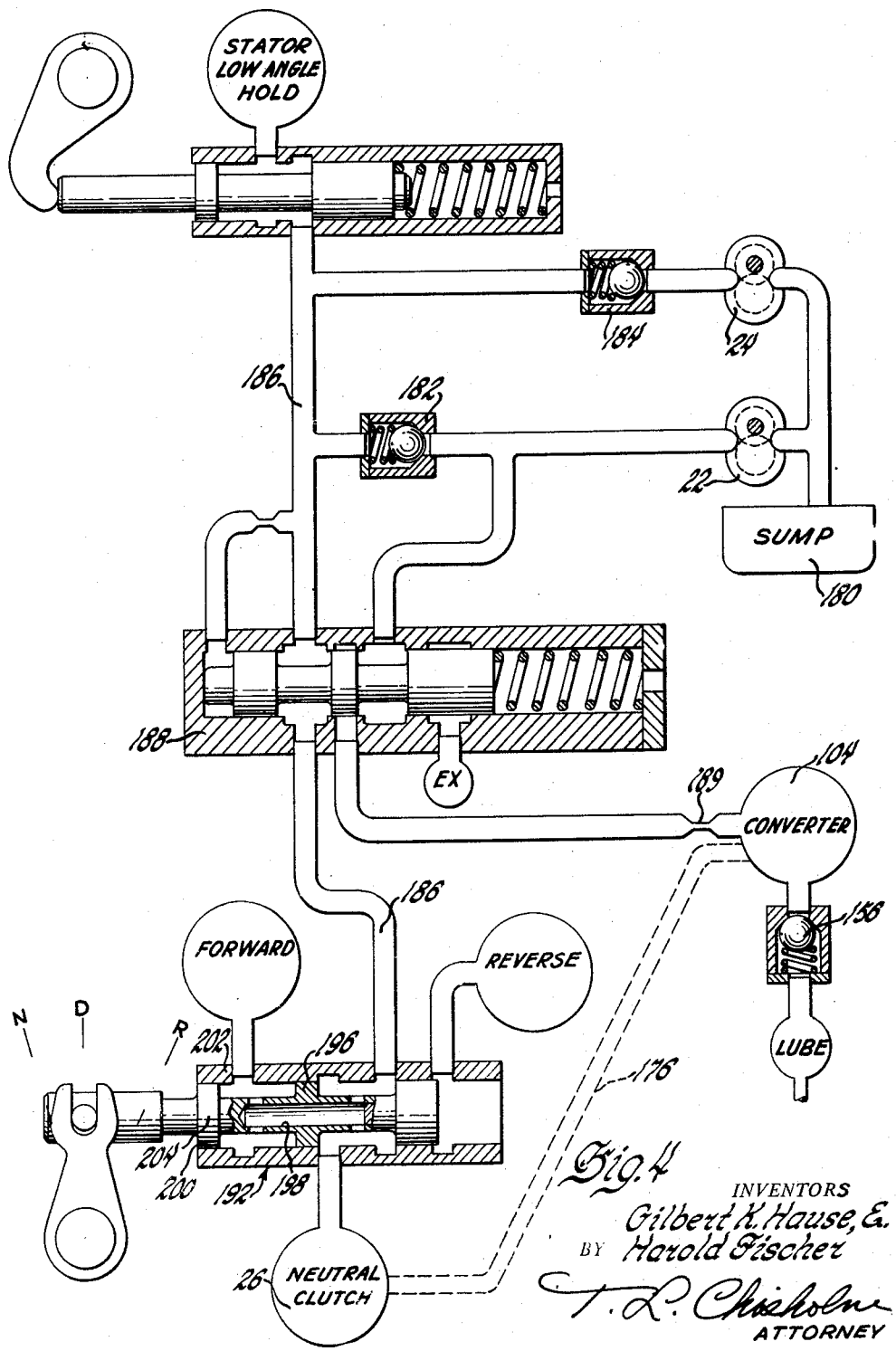

2,957,557
TRANSMISSION

Gilbert K. Hause, Franklin, and Harold Fischer, Flint, Mich., assignors to General Motors Corporation, Detroit, Mich., a corporation of Delaware Filed Nov. 1, 1957, Ser. No. 693,983

14 Claims. (Cl. 192—3.2)

This invention relates to fluid torque transmitting device, for example a torque converter which drives a load such as an automobile, whether or not through reduction gearing, and which can be connected to the engine by a neutral clutch incorporated in the torque converter itself. The invention is particularly concerned with the structure of the clutch and related parts of the torque converter which form elements of the clutch and with the mechanism and control system for engaging and disengaging the clutch.

It is among the objects of the invention to provide an improved neutral clutch for connecting a hydrodynamic torque-transmitting device to a prime mover, which clutch will be urged to disengage by the inherent pressure in the hydrodynamic device and which can be engaged by external controls in spite of the pressure in the hydrodynamic device. It is also an object to provide an improved neutral clutch which cannot be engaged initially if the prime mover is rotating above some predetermined speed while disconnected from the load or output shaft.

Other objects and advantages of the invention will be apparent from the following specification and accompanying drawings, in which:

Fig. 1 is a schematic representation of a transmission having a torque converter including a clutch embodying one form of the invention, this being one-half of a schematic section of the transmission which is symmetrical about its axis of rotation, Fig. 2 is a corresponding half-section of one form of actual structure of torque converter and clutch shown schematically in Fig. 1, Fig. 3 shows pressures at various points in the torque converter plotted against radius of rotation, and Fig. 4 is a schematic hydraulic diagram of a control system for operating the transmission shown in Fig. 1.

As shown in Fig. 1 the transmision includes in general an input or engine shaft 10 which can be connected by a neutral clutch 12 to drive a hydrodynamic torque converter 14, which in turn drives planetary reduction gearing 16 connected to a final drive or output shaft 18. The particular forms of the torque converter and of the reduction gearing are immaterial to this invention and these may be constructed for example as shown in detail in Italian Patent 559,636 and in corresponding Belgian Patent 551,336. However, the problems solved by this invention are particularly acute with torque converters having an impeller such as I which drives a plurality of turbines such as $T_1$, $T_2$ and $T_3$ and which has a reaction device or stator R having blades 20 of adjustable angular position, as more fully disclosed in the Italian and Belgian patents referred to.

A front pump 22 is constantly driven by the engine shaft 10, and a rear pump 24 is driven by the output shaft 18. These pumps form sources of control oil under pressure responsive respectively to operation of the engine and to forward motion of the vehicle. The neutral clutch 12 in the present invention is released by the inherent pressure of oil within the torque converter when the engine is running and is engaged, against the release pressure, by a servo or expansible fluid pressure chamber 26 to which oil is admitted under pressure by suitable control mechanism, as will be explained.

Referring to Fig. 2, one form of actual structure of the torque converter to which our invention is applicable includes a flywheel 100 bolted to the engine shaft 10 and bolted to a torque converter casing including an outer casing or shell 102 and a front cover 103. The casing 102 and cover 103 form with the other parts of the apparatus a closed chamber or working space 104. The impeller I includes blades 105 attached to impeller shell 106 which at its center edge is riveted to quarter-toroidal shell 110 which is formed at its outer edge into one member of the neutral clutch 12. The other member of the neutral clutch is formed in or attached to the shell 102. The shell 110, with the working space 104 forms an expansible fluid pressure chamber for disengaging the clutch. When the clutch 12 is engaged by controls to be explained, the impeller is driven by the engine.

The converter shell 102 is welded to or formed integral with a hub 112, in turn formed integral with or welded to a tube 114 which constitutes a drive shaft for the front pump 22. The hub 112 is drilled and the tube 114 is spaced from a stator supporting sleeve 116 to form a passage 118 through which oil may be admitted from the pump 22 under control of suitable valves, to be described, to the space between the shell 110 and the shell 102 which constitutes the pressure chamber 26 which controls the clutch 12.

The first turbine $T_1$ includes an outer shell 122 to which blades 123 are fixed. The shell 122 is attached to a flange 124 having openings 124a and welded to a hub 125 supported in the cover plate 103 by a radial bearing 126 and a thrust bearing 128. The hub 125 is splined to the front end of $T_1$ output shaft 130, the rear end of which is connected to the gearing 16, as more fully disclosed in the Italian and Belgian patents. The flange 124 thus supports the front end of shaft 130.

The second turbine $T_2$ includes an outer shell 131 and 132 supported on a spider 134 riveted to a flange forming the front end of a tubular shaft 136 which surrounds shaft 130 and forms the $T_2$ output shaft connected to the planetary gearing as shown in the Italian patent.

The third turbine $T_3$ includes blades 138 attached to a shell 140 riveted to a hub 142 splined to the front end of tubular shaft 144 which forms the output shaft for $T_3$ and is disposed between shafts 130 and 136 and connected at its rear end to the carriers of the planetary gearing which are connected to the final drive shaft 18, as disclosed in the Italian patent. Reaction member R includes an annular cylinder 146 fixed to the stator sleeve 116 and supported for rotation by bearings 148. The cylinder 146 contains an annular piston 150 which may be moved by any suitable control apparatus to position crank pins 152 formed on shafts 154 each of which supports a blade 20, the angular position of each blade being determined by the linear position of the piston in the cylinder as is known.

The front pump 22 supplies oil to the converter space 104 through any suitable passage and oil flows from the converter to the usual sump through a pressure responsive relief valve 156. This maintains the converter filled with oil at a pressure such as 30 pounds per square inch.

The front cover 103 carries blades 158 which form a centrifugal pump to balance certain pressures developed in the torque converter, as more fully described in British Patent 770,599, published March 20, 1957. It is significant for the purposes of this invention that the blades 158 rotate whenever the engine is running and that when the transmission is in neutral the impeller I is not rotating while the engine is.

As so far described, except for the arrangement for controlling the clutch 12, the general arrangement of the apparatus is known. The clutch 12 is disengaged by the constantly present converter pressure and is engaged by supplying a superior pressure to the space 26 from the customary control system. The pressure of the control system is ordinarily constant and may be of the order of 90 pounds per square inch and this is adequate to overcome the force of converter pressure and engage the clutch under ordinary circumstances, for example when the engine is turning slowly, as is usual on starting the car. However, if the engine idles fast, as is customary when it is cold, the rotation of the blades 158 can develop enough pressure due to centrifugal action to overcome the engaging pressure in the chamber 26 and to disengage the clutch.

The reason for this extraordinary force causing disengagement of the clutch may be understood from Fig. 3. In any confined rotating body of liquid the pressure due to centrifugal action in the liquid at any point is a function of the square of the radius of rotation of the point. The pressure at all points can be represented by a curve such as 160 for one particular speed of rotation $a$ of the liquid or a curve such as 162 representing pressures at a higher speed of rotation $a+b$. In these curves abscissae represent pressure and ordinates represent radii of rotation.

In torque converters as illustrated in Fig. 2 the parts inherently and unavoidably divide the entire torque converter chamber into a number of pockets and hold the liquid in a number of masses which do not communicate significantly near the axis of the converter. These separate masses of liquid can rotate at different speeds and cause different pressures which can cause the clutch to disengage. For example, the third turbine shell 131 and its hub 142 and the customary bearings form a substantially imperforate partition extending from the center of the torque converter chamber substantially to its point of greatest radius, that is adjacent the second turbine shell 122. This divides the torque converter space 104 into two chambers schematically represented at 164 and 166 in Fig. 1, which communicate at their peripheries by channel 168 between shells 102 and 122. When the engine is rotating the blades 158 rotate the oil in the chamber 166 to the left of the shell 131, substantially at engine speed. This produces a pressure gradient in chamber 166 which at a given engine speed $a+b$ may follow curve 162 in Fig. 3. On this curve the component $P_0$ of the pressure is the static pressure maintained in the torque converter by the pump and control system regardless of rotation of the liquid. Any centrifugal pressures due to rotation of the liquid are added to this amount. At some particular speed of rotation a point, whose distance from the center of rotation is $R_1$, will have a resultant or total pressure of $P_1$. At a distance $R_2$ from the center of the rotation the total pressure will be $P_2$. The pressure $P_3$ at radius $R_3$ in Fig. 3 represents the pressure at the greatest distance from the axis, in the torque converter, which is the edge of the rotating body of liquid against the shell 102 at the radius $R_3$ in Fig. 2.

Assume that the engine is running with the car at rest and the neutral clutch disconnected which is the condition on starting the car. The pressure $P_3$ is communicated through the space 168 between shells 102 and 122 to the body of liquid in chamber 164, or the right half of the torque converter chamber 104. This body of liquid is not rotating at any significant speed because the inside surface of the rotating shell 102 is smooth, producing little if any rotating effect on the liquid, and this liquid, even if urged to rotate is retarded or held substantially still by the turbine blades which are held stationary by the vehicle. Consequently, the highest pressure $P_3$ exists throughout the entire body of liquid in chamber 164 on the right of shell 131, from the center to the point of greatest radius. Consequently, the pressure $P_3$ acts over the entire area of the shell 110.

If the inner radius of the shell 110 is $R_1$ and the outer radius is $R_2$ the total force urging the shell toward the right in Fig. 2 may be represented graphically in Fig. 3 by the area of the vertically shaded space bounded by the vertical axis of radii, the vertical line representing $P_3$, and the two horizontal lines representing $R_1$ and $R_2$ respectively.

If the engine is running fast, the pressure $P_3$ can easily exceed any line pressure (of 90 pounds for example) which can be exerted in the chamber 26 and this can prevent engagement of the neutral clutch 12 even if line pressure should be applied to chamber 26.

Therefore, it is one of the specific objects of the invention to provide a clutch in a torque converter which is released by converter pressure whenever the engaging means permits release and is engaged against the releasing force of converter pressure by suitable means and suitable controls.

It is also an object to provide a neutral clutch within a torque converter which cannot be initially engaged, even by deliberate operation of the controls, when the car is standing and the engine is running above a predetermined speed. This prevents harsh or shock engagement of the clutch and prevents damage to the clutch and to tires in attempted jack rabbit starts.

The invention makes possible a clutch construction which can readily be designed or changed to prevent initial engagement at or above any desired engine speed.

One way of achieving the objects of the invention is to form the clutch and related torque converter parts as will now be described and as shown in Fig. 2.

The driving member of the clutch is secured to the shell 102 and includes a ring 170 fixed in an annular groove in the shell and having a female frusto-conical clutch face 172 which may be engaged by corresponding male frusto-conical clutch face 174 formed on the edge of the shell 110. The clutch faces are arranged so that movement of the shell 110 to the right under the influence of converter pressure releases the neutral clutch 12 and movement to the left under the influence of the pressure in the chamber 26 engages it. In general, when it is desired to engage the clutch, control oil under suitable pressure, such as 90 pounds per square inch, derived from either or both of the pumps 22 and 24, is admitted to the chamber 26 and this overcomes the force of converter pressure to engage the clutch. When the clutch is to be disengaged the chamber 26 is vented to permit converter pressure to release it.

Whenever the neutral clutch is disengaged the surfaces 172 and 174 are necessarily separated. Since the only seals between the converter working space and the clutch apply chamber 26 are the sliding seal 175 and the seal formed by the clutch surfaces in contact, disengagement of the clutch establishes hydraulic connection between the converter working space and the clutch apply chamber. This connection is represented by the dotted passage 176 in Fig. 4. When the clutch is disengaged by the controls, that is when the apply chamber 26 is vented, the passage 176 forms a leak from the converter to the usual sump. However, the capacity of the front pump and of the converter feed connection is sufficient to maintain the desired pressure in the converter in spite of this leak, particularly if the surfaces 172 and 174 are close together, and this pressure can maintain the clutch disengaged. On the other hand when the clutch is to be engaged the apply chamber 26 must be filled at a pressure greater than converter pressure, and to do this the leak 176 must be closed otherwise it would vent the clutch apply chamber 26 through the converter working space and through the relief valve 156 to the sump and prevent the pressure in the apply chamber from exceeding converter pressure.

Suppose at a given engine speed, with the car standing and with the clutch disengaged a total pressure $P_3$, holding the clutch disengaged, is maintained in the torque converter in spite of leakage through the clutch and chamber 26. If now the clutch is to be engaged chamber 26 is connected to a source of pressure capable of developing a higher pressure, e.g. 90 pounds. Connection of the chamber 26 to the source at first stops the leakage through the open clutch by closing communication between the chamber 26 and the sump, as explained below in connection with Fig. 3. This permits pressure to be equalized on opposite sides of the shell 110. Then if oil is supplied to the chamber 26 faster than it can flow through the relief valve, there will be a slightly higher pressure in chamber 26 than in the converter, and the superior pressure in the chamber 26 will slide the shell 110 to the left, bringing the clutch faces into contact and closing the leak 176. With the leak closed the pressure in chamber 26 quickly builds up to the pressure of the control source which is enough to engage the clutch with sufficient force to transmit the torque required to drive the vehicle.

Since a slightly higher pressure than that in the converter must be built up in chamber 26 before the clutch faces can start to close the leak 176, it is apparent that the initial closing of the clutch faces, as so far described will be controlled by the pressure $P_3$ and hence by engine speed. Above some critical engine speed, $P_3$ can equal or exceed the pressure in chamber 26 and can prevent engagement of the clutch. In some devices we have found that the usual line pressures, when applied to chamber 26 would not engage the clutch at relatively low engine speeds which are within the range of the fast idle setting automatically established by the starting device when the engine is cool.

To avoid this, and to permit the clutch to engage at any desired engine speed, we may if desired place an annular spring 178 between shells 102 and 110. This spring constantly urges the shell 110 to the left to engage the clutch. The force of this spring may be so chosen with relation to the converter pressure and area of shell 110 and with relation to the line pressure to be supplied to chamber 26 that the clutch will engage at any desired engine speed. By this arrangement we can set the controls to start the car but automatically prevent engagement of the neutral clutch and prevent starting of the car as long as the engine is racing faster than any selected speed. The clutch will engage automatically when the speed falls below the predetermined value. This is accomplished by selection of the force of the spring with reference to the area of the shell 110 and known speed-pressure curves such as 160 and 162. For example, if it is desired to prevent initial clutch engagement at engine speeds above speed $a$, in Fig. 3, the force of the spring may equal the product of the area of shell 110 and the value of the pressure on curve 160 integrated from $R_1$ to $R_2$.

This arrangement has the advantage of preventing sudden or jerky starts due to a racing engine and prevents damage to the transmission and to tires by unskilled or impatient drivers. The device is of advantage mainly in starting the car, and the torque converter construction inherently prevents disengagement of the clutch due to engine speed once it has become engaged, as long as control pressure is maintained in the chamber 26.

After the neutral clutch is once engaged it will not be disengaged subsequently by high pressure developed within the converter due to rotation, as long as line pressure is maintained in chamber 26, because the impeller I rotates the mass of liquid bearing against the shell 110 at the same speed that the liquid on the left of the shell 131 is rotated by the blades 158. This establishes in the body of liquid bearing on the shell 110 a pressure gradient corresponding but opposite to the curve 162, having a pressure $P_3$ at the periphery which opposes the pressure $P_3$ developed by blades 158 and thus prevents the pressure $P_3$ from being communicated to the entire area of the shell 110. The innermost radius of the shell 110 may be considered to be $R_1$ and at this point the pressure is $P_1$. The outermost radius of the shell may be considered $R_2$ at which the pressure is $P_2$. Thus the pressure urging the clutch to disengage will be the integral of the pressure $P_1$ to $P_2$. This produces a disengaging force which can be represented in Fig. 3 by the diagonally shaded area bounded by the axis of ordinates, the line of curve 162, horizontal line through $R_1$ and the horizontal line through $R_2$. Obviously this is much less than the force urging the clutch to disengage when the pressure $P_3$ is acting on the entire area of the shell 110, as explained above, and is not enough to disengage the clutch against the force of the control pressure in apply chamber 26.

Fig. 4 shows schematically one form of system and apparatus for controlling the neutral clutch 12. The front pump 22 and the rear pump 24 withdraw oil from sump 180 and discharge it through check valves 182 and 184, respectively, to a main line 186 which supplies oil through any suitable constant pressure regulator valve 188 and control orifice 189 to the converter working space 104 and to the neutral clutch apply chamber 26. Whenever either pump 22 or 24 is maintaining pressure above a predetermined minimum value, as is known, oil is constantly supplied to the converter space 104, being returned to lubrication lines and to the sump through the pressure responsive relief valve 156, previously described.

Oil is supplied to the neutral clutch apply chamber 26 under the control of a manually operated selector valve 192. When the valve is in either the drive position indicated at D or the reverse position indicated at R, the clutch apply chamber 26 is cut off from the sump by land 204 and oil can flow from the main line to the clutch apply chamber from line 186 through hollow stem 198 at a constant pressure determined by the regulator valve 188. However, when the selector valve is in the N, for neutral, position the land 196 blocks the main line 186 and the neutral clutch chamber 26 is vented thru the hollow valve stem 198 thru the exhaust port 200 formed by the end of the valve casing 202 which is opened by movement of the land 204 out of the bore of the valve casing.

We claim:

1. In a transmission in combination, an impeller adapted to be driven by an engine, a turbine adapted to drive a load, a casing surrounding the impeller and turbine and forming a closed container for liquid to be circulated between the impeller and turbine, means for maintaining the container filled with liquid under pressure, means for rotating the casing, a clutch for rotating the impeller including a first clutch element secured to the casing and a second clutch element secured to the impeller, the second element forming with the casing an expansible fluid pressure chamber adapted to disengage the clutch by pressure of liquid in the container, a second expansible chamber connected to the second element so as to oppose the first expansible chamber and means for supplying fluid under pressure to the second expansible chamber for overcoming the force of the first expansible chamber and engaging the clutch.

2. In a transmission in combination, an impeller adapted to be driven by an engine, a turbine adapted to drive a load, a casing surrounding the impeller and turbine and forming a closed container for liquid to be circulated between the impeller and turbine, means for maintaining the container filled with liquid under pressure, means for rotating the casing, a clutch for rotating the impeller including a first clutch element secured to the casing and a second clutch element secured to the impeller, the second element forming with the casing an expansible fluid pressure chamber adapted to disengage the clutch by pressure of liquid in the container, a second expansible chamber within the container connected to the second element so as to oppose the first expansible chamber and means for supplying fluid under pressure to the second expansible chamber for overcoming the force of the first expansible chamber and engaging the clutch.

3. In a transmission in combination, an impeller adapted to be driven by an engine, a turbine adapted to drive a load, a casing surrounding the impeller and turbine and forming a closed container for liquid to be circulated between the impeller and turbine, means for maintaining the container filled with liquid under pressure, means for rotating the casing, means separating the liquid in the casing into two bodies, means for rotating one body of liquid when the casing is rotated, the other body of liquid being held by the turbine when connected to a stationary load, a clutch for rotating the impeller including a first clutch element secured to the casing and a second clutch element secured to the impeller, the second element forming with the casing an expansible chamber adapted to disengage the clutch by pressure of liquid in the container, a second expansible chamber connected to the second element so as to oppose the first expansible chamber and means for supplying fluid under pressure to the second expansible chamber for overcoming the force of the first expansible chamber and engaging the clutch.

4. In a transmission in combination, an impeller adapted to be driven by an engine, a turbine adapted to drive a load, a casing surrounding the impeller and turbine and forming a closed container for liquid to be circulated between the impeller and turbine, means for maintaining the container filled with liquid under pressure, means for rotating the casing, means separating the liquid in the casing into two bodies including means establishing communication between the bodies near the periphery and means preventing communication near the center, means for rotating one body of liquid when the casing is rotated, the other body of liquid being held by the turbine when connected to a stationary load, a clutch for rotating the impeller including a first clutch element secured to the casing and a second clutch element secured to the impeller, the second element forming with the casing an expansible chamber adapted to disengage the clutch by pressure of liquid in the container, a second expansible chamber connected to the second element so as to oppose the first expansible chamber and means for supplying fluid under pressure to the second expansible chamber for overcoming the force of the first expansible chamber and engaging the clutch.

5. In a transmission in combination, an impeller adapted to be driven by an engine, a turbine adapted to drive a load, a casing surrounding the impeller and turbine and forming a closed container for liquid to be circulated between the impeller and turbine, means for rotating the casing, a clutch for rotating the impeller including a first clutch element secured to the casing and a second clutch element secured to the impeller, the second element forming with the casing an expansible chamber adapted to control the clutch, a second expansible chamber within the container adapted to control the clutch, the clutch when disengaged forming a restricted passage between the two expansible chambers which passage is closed when the clutch is engaged, means for maintaining the container filled with liquid under pressure whereby the first expansible chamber will urge the clutch to disengage and means for supplying fluid under pressure to the second expansible chamber motor for overcoming the force of the first expansible chamber to engage the clutch.

6. In a transmission in combination, an impeller adapted to be driven by an engine, a turbine adapted to drive a load, a casing surrounding the impeller and turbine and forming a closed container for liquid to be circulated between the impeller and turbine, means for rotating the casing, a clutch for rotating the impeller including a first clutch element secured to the casing and a second clutch element secured to the impeller, the second element forming with the casing an expansible chamber adapted to control the clutch, a second expansible chamber within the container adapted to control the clutch, the clutch when disengaged forming a restricted passage between the two expansible chambers which passage is closed when the clutch is engaged, means for maintaining the container filled with liquid under pressure whereby the first expansible chamber will urge the clutch to disengage, means for supplying fluid under pressure to the second expansible chamber for overcoming the force of the first expansible chamber to engage the clutch and means for venting the second chamber to disengage the clutch.

7. In a transmission in combination, an impeller adapted to be driven by an engine, a turbine adapted to drive a load, a casing surrounding the impeller and turbine and forming a closed container for liquid to be circulated between the impeller and turbine, means for rotating the casing, a clutch for rotating the impeller including a first clutch element secured to the casing and a second clutch element secured to the impeller, the second element forming with the casing an expansible chamber adapted to disengage the clutch, a second expansible chamber within the container adapted to engage the clutch, the clutch when disengaged forming a restricted passage between the two expansible chambers which passage is closed when the clutch is engaged, means for venting the second chamber to permit the clutch to disengage, means for maintaining the container filled with liquid under pressure whereby the first expansible chamber will disengage the clutch when the second chamber is vented, and means for closing the vent and supplying fluid under pressure to the second expansible chamber for overcoming the force of the first expansible chamber to engage the clutch.

8. In a transmission in combination, an impeller adapted to be driven by an engine, a turbine adapted to drive a load, a casing surrounding the impeller and turbine and forming a closed container for liquid to be circulated between the impeller and turbine, means for rotating the casing, a clutch for rotating the impeller including a first clutch element secured to the casing and a second clutch element secured to the impeller, the second element forming with the casing an expansible chamber adapted to disengage the clutch, a second expansible chamber within the container adapted to engage the clutch, the clutch when disengaged forming a restricted passage between the two expansible chambers which passage is closed when the clutch is engaged, means for continuously supplying liquid under pressure to the container, a pressure-responsive release valve for draining liquid from the container and adapted to maintain one predetermined pressure in the container, means for venting the second chamber to permit the first expansible chamber to disengage the clutch, means for closing the vent to equalize pressure in the two chambers, and means for supplying to the second chamber liquid at a rate greater than the rate of flow through the release valve and at a higher pressure than maintained by the release valve for overcoming the force of the first expansible chamber to engage the clutch.

9. In a transmission in combination, an impeller adapted to be driven by an engine, a turbine adapted to drive a load, a casing surrounding the impeller and turbine and forming a closed container for liquid to be circulated between the impeller and turbine, means for rotating the casing, a clutch for rotating the impeller including a first clutch element secured to the casing and a second clutch element secured to the impeller, the second element forming with the casing an expansihble chamber adapted to disengage the clutch, a second expansible chamber within the container adapted to engage the clutch, the clutch when disengaged forming a passage between the two expansible chambers which passage is closed when the clutch is engaged, means for continuously supplying liquid under pressure to the container, a pressure-responsive release valve for draining liquid from the container and adapted to maintain one predetermined pressure in the container, means for venting the second chamber to permit the first expansihble chamber to disengage the clutch, means for closing the vent to equalize pressure in the two chambers, means for reducing the flow area of the passage when the pressure is equal and means for supplying to the second chamber liquid at a rate greater than the rate of flow through the release valve and at a higher pressure than maintained by the release valve for overcoming the force of the first expansible chamber to engage the clutch.

10. In a transmission in combination, an impeller adapted to be driven by an engine, a turbine adapted to drive a load, a casing surrounding the impeller and turbine and forming a closed container for liquid to be circulated between the impeller and turbine, means for rotating the casing, a clutch for rotating the impeller including a first clutch element secured to the casing and a second clutch element secured to the impeller, the second element forming with the casing an expansible chamber adapted to disengage the clutch, a second expansible chamber within the container adapted to engage the clutch, the clutch when disengaged forming a passage between the two expansible chambers which passage is closed when the clutch is engaged, means for continuously supplying liquid under pressure to the container, a pressure-responsive release valve for draining liquid from the container and adapted to maintain one predetermined pressure in the container, means for venting the second chamber to permit the first expansible chamber to disengage the clutch, means for closing the vent to equalize pressure in the two chambers, a spring urging the clutch members toward each other for reducing the flow area of the passage and means for supplying to the second chamber liquid at a rate greater than the rate of flow through the release valve and at a higher pressure than maintained by the release valve for overcoming the first expansible chamber to engage the clutch.

11. In a transmission in combination, an impeller adapted to be driven by an engine, a turbine adapted to be connected to an initially stationary load, a casing surrounding the impeller and turbine and forming a closed container for liquid to be circulated between the impeller and turbine, means for rotating the casing, a clutch for rotating the impeller including a first clutch element secured to the casing and a second clutch element secured to the impeller, the second element forming with the casing an expansible chamber adapated to disengage the clutch, a second expansible chamber for opposing the first expansible chamber to engage the clutch, means in the casing for generating a pressure in the first expansible chamber motor which is a function of the speed of rotation of the casing and means for supplying to the second expansible chamber liquid under a substantially constant pressure whereby the second chamber will overcome the force of the first chamber and engage the clutch when the casing rotates below a predetermined speed.

12. In a transmission in combination, an impeller adapted to be driven by an engine, a turbine adapted to be connected to an initially stationary load, a casing surrounding the impeller and turbine and forming a closed container for liquid to be circulated between the impeller and turbine, means for rotating the casing, a clutch for rotating the impeller including a first clutch element secured to the casing and a second clutch element secured to the impeller, an expansible chamber adapted to disengage the clutch and hydraulically connected to the casing, a second expansible chamber for opposing the first expansible chamber to engage the clutch, means in the casing for generating a pressure in the first expansible chamber which is a function of the speed of rotation of the casing and means for supplying to the second expansible chamber liquid under a substantially constant pressure whereby the second chamber will overcome the force of the first chamber and engage the clutch when the casing rotates below a predetermined speed.

13. In a transmission in combination, an impeller adapted to be driven by an engine, a turbine adapted to be connected to an initially stationary load, a casing surrounding the impeller and turbine and forming a closed container for liquid to be circulated between the impeller and turbine, means for rotating the casing, a clutch for rotating the impeller including a first clutch element secured to the casing and a second clutch element secured to the impeller, the second element forming with the casing an expansible chamber adapted to disengage the clutch, a second expansible chamber for opposing the first expansible chamber to engage the clutch, means for maintaining the casing filled with liquid under a predetermined minimum pressure, means in the casing for generating additional pressure in the first expansible chamber which is a function of the speed of rotation of the casing and means for supplying to the second expansible chamber liquid under a constant pressure whereby the second chamber will overcome the force of the first chamber and engage the clutch when the casing rotates below a predetermined speed.

14. A transmission comprising in combination an input shaft adapted to be connected to a prime mover, an output shaft adapted to be connected to a load, a clutch having a driving and a driven element for connecting the shafts, said clutch having a torque-transmitting capacity which varies with the force urging said driving and driven elements together, means for urging the clutch elements apart with a varying force which is a function of the speed of rotation of the input shaft and means for urging the clutch elements together with a substantially constant force, whereby the clutch will be engaged when the input shaft rotates below a predetermined speed.

References Cited in the file of this patent

UNITED STATES PATENTS

| | | |
|---|---|---|
| 2,640,572 | O'Brien | June 2, 1953 |
| 2,731,119 | Burdett et al. | Jan. 17, 1956 |
| 2,793,726 | Jandasek | May 28, 1957 |
| 2,836,274 | Newell | May 27, 1958 |

UNITED STATES PATENT OFFICE
CERTIFICATION OF CORRECTION

Patent No. 2,957,557 October 25, 1960

Gilbert K. Hause et al.

It is hereby certified that error appears in the above numbered patent requiring correction and that the said Letters Patent should read as corrected below.

Column 2, line 41, after "and" insert -- blades --.

Signed and sealed this 30th day of May 1961.

(SEAL)
Attest:

ERNEST W. SWIDER
Attesting Officer

DAVID L. LADD
Commissioner of Patents